(12) United States Patent
Li et al.

(10) Patent No.: US 12,261,813 B2
(45) Date of Patent: Mar. 25, 2025

(54) LOCATION-RELATED TOPIC DISCUSSION SYSTEM, OPERATING METHOD AND COMPUTER-READABLE RECORDING MEDIUM

(71) Applicant: Framy Inc., Grand Cayman (KY)

(72) Inventors: Yu-Hsien Li, Taipei (TW); Yu-Chih Lee, New Taipei (TW); Hao-Wen Mei, Taipei (TW)

(73) Assignee: Framy Inc., Grand Cayman (KY)

( * ) Notice: Subject to any disclaimer, the term of this patent is extended or adjusted under 35 U.S.C. 154(b) by 57 days.

(21) Appl. No.: 18/299,060

(22) Filed: Apr. 12, 2023

(65) Prior Publication Data
US 2023/0328024 A1 Oct. 12, 2023

(30) Foreign Application Priority Data
Apr. 12, 2022 (TW) .................................. 111113761

(51) Int. Cl.
| | |
|---|---|
| G06F 15/16 | (2006.01) |
| G06F 3/04817 | (2022.01) |
| H04L 51/216 | (2022.01) |
| H04L 51/222 | (2022.01) |
| H04L 51/52 | (2022.01) |

(52) U.S. Cl.
CPC ........ *H04L 51/222* (2022.05); *G06F 3/04817* (2013.01); *H04L 51/216* (2022.05); *H04L 51/52* (2022.05)

(58) Field of Classification Search
CPC ...... H04L 51/222; H04L 51/216; H04L 51/52
See application file for complete search history.

(56) References Cited

U.S. PATENT DOCUMENTS

| | | | |
|---|---|---|---|
| 2009/0005021 A1* | 1/2009 | Forstall | H04W 4/02 455/414.3 |
| 2015/0334077 A1 | 11/2015 | Feldman | |

(Continued)

FOREIGN PATENT DOCUMENTS

| | | |
|---|---|---|
| CN | 107508742 B | 7/2018 |
| CN | 105323308 B | 1/2019 |

(Continued)

*Primary Examiner* — Padma Mundur
(74) *Attorney, Agent, or Firm* — Li & Cai Intellectual Property Office (57) ABSTRACT

A location-related topic discussion system, an operating method, and a computer-readable recording medium are provided. The system includes a server having a topic-discussion database. In the server, the topic-discussion database is queried for obtaining one or more location-related discussion topics within a geographic range according to location information transmitted by a user device. The server then provides one or more location-related discussion-topic-category linking icons to the user device, and the one or more icons can be marked on a graphical user interface initiated by the user device. When a user selects one of location-related discussion-topic-category links, the server accordingly provides contents on a first layer topic-discussion page to be displayed by the user device. The first layer topic-discussion page includes multiple popularity-sorted topic-discussion areas and location-related discussion topic categories in accordance with personal preference of the user.

8 Claims, 7 Drawing Sheets

(56) References Cited

U.S. PATENT DOCUMENTS

2016/0182438 A1    6/2016  Faramarzi
2017/0192642 A1*   7/2017  Fishman .............. G06F 3/0488

FOREIGN PATENT DOCUMENTS

CN    112836136  A    5/2021
CN    109547110  B    11/2021
TW    202209088  A    3/2022

* cited by examiner

LOCATION-RELATED TOPIC DISCUSSION SYSTEM, OPERATING METHOD AND COMPUTER-READABLE RECORDING MEDIUM

CROSS-REFERENCE TO RELATED PATENT APPLICATION

This application claims the benefit of priority to Taiwan Patent Application No. 111113761, filed on Apr. 12, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system for providing a discussion topic, and more particularly to a system for providing a graphical user interface including a location-related discussion topic, an operating method, and a non-transitory computer-readable recording medium.

BACKGROUND OF THE DISCLOSURE

Currently, the Internet has become a major source from which a user can acquire information. Many search engines are also provided for the Internet to allow the user to easily look up information by using keywords. When a user wants to search for answers on a specific topic or discuss the specific topic with other users, the user can further create a discussion topic on a network forum. The network forum allows other users that are interested in the discussion topic to join the discussion, so that the user who created the discussion topic can obtain opinions from various respondents.

In a conventional network forum or a conventional service that hosts these discussions, the topics are usually fixed on what was proposed by the user, and the discussions are generally simple and lack in diversity. Further, the discussion topics in the conventional network forum are generally not geographically-related topics, i.e., the discussion topics are not localized based on a location of the user. Therefore, the conventional services can fail to recommend to users any topic that is related to a location of interest and that matches with the interest of the user. Furthermore, the user can only use keywords for searching the network forum, without obtaining any location-related discussion topic.

SUMMARY OF THE DISCLOSURE

In response to the above-referenced technical inadequacies, in which the conventional discussion topics in certain web pages lack the attributes of locations, the present disclosure provides a location-related topic discussion system, an operating method, and a non-transitory computer-readable recording medium. The system can rely on location information to provide location-related discussion topics. That is, the discussion topics being searched or established in the location-related topic discussion system are generally related to geographic locations, and can still be the discussion topics that match with a personal preference.

In one aspect of the present disclosure, the location-related topic discussion system includes a server that has a topic-discussion database. According to an operating process of the system, when a server receives a user data and location information from a user device via a network, the topic-discussion database is queried according to a personal preference of a user and the location information, so as to obtain one or more location-related discussion topic categories that match with the personal preference. After a query result is provided to the user device, a graphical user interface is initiated in the user device and is used to display the one or more location-related discussion topic categories.

Furthermore, after querying the topic-discussion database according to the personal preference and the location information, one or more topic-discussion areas that relate to a discussion topic and sorted by popularity can be obtained based on the location information.

When the content of the first layer topic-discussion page displayed on the graphical user interface is formed, in the first layer topic-discussion page, multiple location-related topic-discussion areas that relate to a discussion topic and are sorted by popularity are displayed in a first direction, and multiple location-related discussion topic categories in accordance with the personal preference are displayed in a second direction.

Before the first layer topic-discussion page is formed, the server determines a geographic range according to the location information received from the user device. After the topic-discussion database is queried, one or more location-related discussion topics within the geographic range can be obtained. Therefore, one or more location-related discussion-topic-category linking icons corresponding to the discussion topics are provided to the user device. The linking icons are marked on the graphical user interface initiated by the user device.

In an aspect of the present disclosure, when the server receives a selection of one of the location-related discussion topic category links from the user device, a first layer topic-discussion page is formed. The first direction is a vertical direction that allows a user of the user device to browse the topic-discussion areas sorted by popularity by performing a vertical swipe gesture; and the second direction is a horizontal direction that allows the user to browse the location-related discussion topic categories corresponding to the personal preference by performing a horizontal swipe gesture.

Further, the server continuously provides the topic-discussion areas that are sorted by popularity based on the vertical swipe gesture performed by the user in the first direction, and a range of a location related to the selected location-related discussion topic category link can gradually expand outward so that the popularity-sorted topic-discussion areas can be continuously provided.

Further, when the popularity-sorted topic-discussion areas provided by the server run out, the server actively switches to another discussion topic.

In an aspect of the present disclosure, the server includes an audiovisual database. When the server receives the location information generated by the user device, the audiovisual database is queried according to the location information so as to acquire one or more location-related audiovisual contents within the geographic range. One or more corresponding location-related audiovisual content linking icons are provided to the user device. The one or more location-related discussion-topic-category linking icons and one or more location-related audiovisual content linking icons can be simultaneously marked on the graphical user interface.

Preferably, the graphical user interface can be a map interface that is used to display the location-related discussion-topic-category linking icons and the location-related audiovisual content linking icons.

Further, when the server receives a selection of one of the topic-discussion areas in the first direction from the user device, the server queries the topic-discussion database to provide discussion contents of the selected topic-discussion area and display the discussion contents on a discussion-topic dialogue page on the user device.

Still further, the server receives a selection of one of the discussion-topic categories in the second direction from the user device and then queries the topic-discussion database, and the server then provides a second layer topic-discussion page that includes one or more location-related topic-discussion areas that match with the personal preference in the first direction, and provides the one or more location-related topic-discussion areas in the second direction according to a location attribute of the topics in each of the topic-discussion areas in the first direction.

According to embodiments of the non-transitory computer-readable recording medium of the present disclosure, the non-transitory computer-readable recording medium stores computer instructions that are performed so as to establish a connection with a server of the aforementioned location-related topic discussion system, load contents, and initiate a graphical user interface. The computer instructions are performed in a user device for performing the steps of forming a display area having a geographic range on the graphical user interface when the user manipulates a touch-sensitive display so as to generate location information, and uploading the location information to the server of the location-related topic discussion system. In the server, the topic-discussion database is queried so as to acquire one or more location-related discussion topics within a geographic range.

The user device receives one or more location-related discussion-topic-category linking icons to be marked on the graphical user interface from the server. Next, the user can select one of the location-related discussion-topic-category linking icons and the server receives the selected location-related discussion topic category link and queries the topic-discussion database so that the content of the first layer topic-discussion page can be obtained. The content of the first layer topic-discussion page includes the one or more topic-discussion areas that are sorted by popularity and one or more location-related discussion topic categories that match with the personal preference in the first layer topic-discussion page.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a location-related topic discussion system, an operating method, and a non-transitory computer-readable recording medium. One of the technical objectives is to allow a user to select a location-related discussion topic via a graphical user interface rather than only using keywords to search discussion topics or obtaining topics of interest from a subscribed network forum. When the user browses contents of different areas, cities, or countries, the location-related topic discussion system of the present disclosure may simultaneously allow the user to access a discussion topic related to a specific geographic location or to establish a location-related discussion topic. Furthermore, the location-related topic discussion system provides a graphical user interface (GUI) that is implemented by means of software for the user to browse the discussion topic. The user can conveniently browse multiple types of location-related topic-discussion areas via a user device such as a mobile phone, a tablet computer, or a personal computer. Moreover, the user can also browse the location-related discussion topics that are recommended by the location-related topic discussion system.

Figure 1:
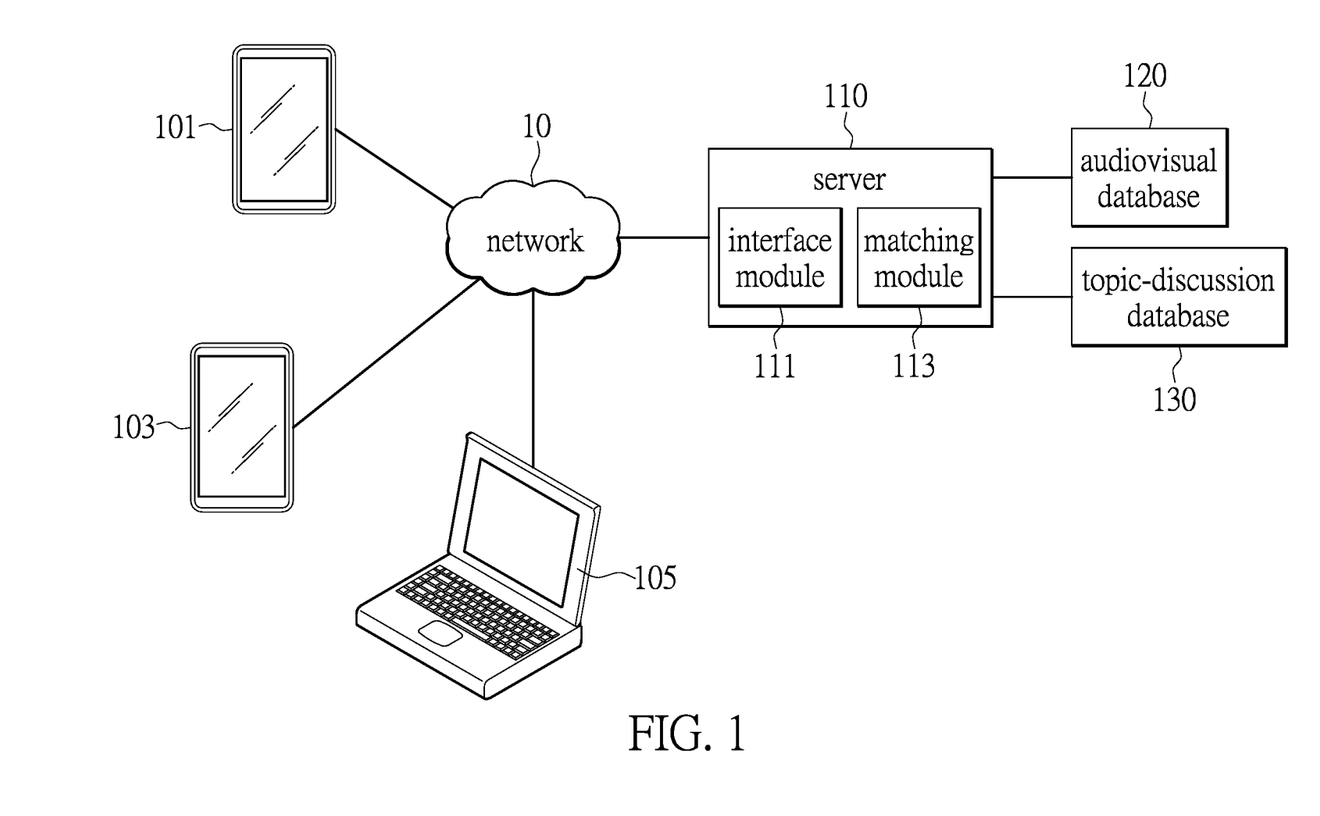
FIG. 1 is a schematic diagram illustrating a location-related topic discussion system according to one embodiment of the present disclosure.

Reference is made to FIG. 1, which is a schematic diagram illustrating a framework of the location-related topic discussion system according to one embodiment of the present disclosure. The location-related topic discussion system is operated via a server 110. According to one objective of providing the location-related discussion topic of the present disclosure, the location-related topic discussion system provides an interface module 111 via the server 110, which provides contents to be displayed on user devices 101, 103, and 105, so that any of the user devices 101, 103, and 105 may initiate a user interface that can be implemented by a webpage or a specific software program for displaying the location-related discussion topic. Further, the location-related topic discussion system provides a matching module 113 that is used to match the contents in a database with location information transmitted by any of the user devices 101, 103, and 105. The contents in the database are such as audiovisual contents and discussion topics. Through the matching module 113, the location-related topic discussion system can rely on the user data (e.g., a user ID allowing the user to log in the system) to obtain the contents that match with the personal preference of the user.

The server 110 relies on a database technology to implement an audiovisual database 120 and a topic-discussion database 130. According to one embodiment of the present disclosure, when the server 110 receives location information and user data from any of the user devices 101, 103, and 105 via a network 10, a software sequence executed in the server 110 queries the topic-discussion database 130 according to the location information (or according to the location information and the user data), so as to acquire one or more location-related discussion topics within a geographic range and one or more location-related discussion-topic-category linking icons corresponding to the one or more location-related discussion topics. The one or more location-related discussion-topic-category linking icons are then transferred to the user devices 101, 103, and 105 and marked on a graphical user interface initiated in each of the user devices 101, 103, and 105.

In addition to providing the location-related discussion topics, after the server 110 receives location information from any of the user devices 101, 103, and 105, the server 110 queries the audiovisual database 120 to obtain one or more location-related audiovisual contents within a geographic range according to the location information (or according to the location information and the user data) 103, and 105. Similarly, the server 110 provides one or more location-related audiovisual content linking icons corresponding to the location-related audiovisual contents to any of the user devices 101, 103, and 105. Thus, the user device initiates a software-implemented user interface that can be an electronic-map-based graphical user interface. One or more location-related discussion-topic-category linking icons and one or more location-related audiovisual content linking icons are marked on the user interface. Therefore, the services of providing the location-related discussion topics and audiovisual contents are implemented. The system also allows the user to arbitrarily adjust the geographic range for browsing the various contents therein and the server 110 can transmit the corresponding linking icons to be marked on the user interface to the user device.

The software programs executed in the server 110 can record user behaviors (for example, the acts of giving a comment, a like, or following and sharing a specific discussion topic) by using an algorithm. The algorithm also calculates an area of interest, e.g., a city, a country, a scenic spot, and a landmark, of the user and the discussion topics that the user is interested in. The users of the server 110 can be further grouped so that the discussion topics that the user is interested in of the area of interest can be effectively recommended to the user. Further, popular topics in the area of interest for each group can also be calculated.

Figure 2:
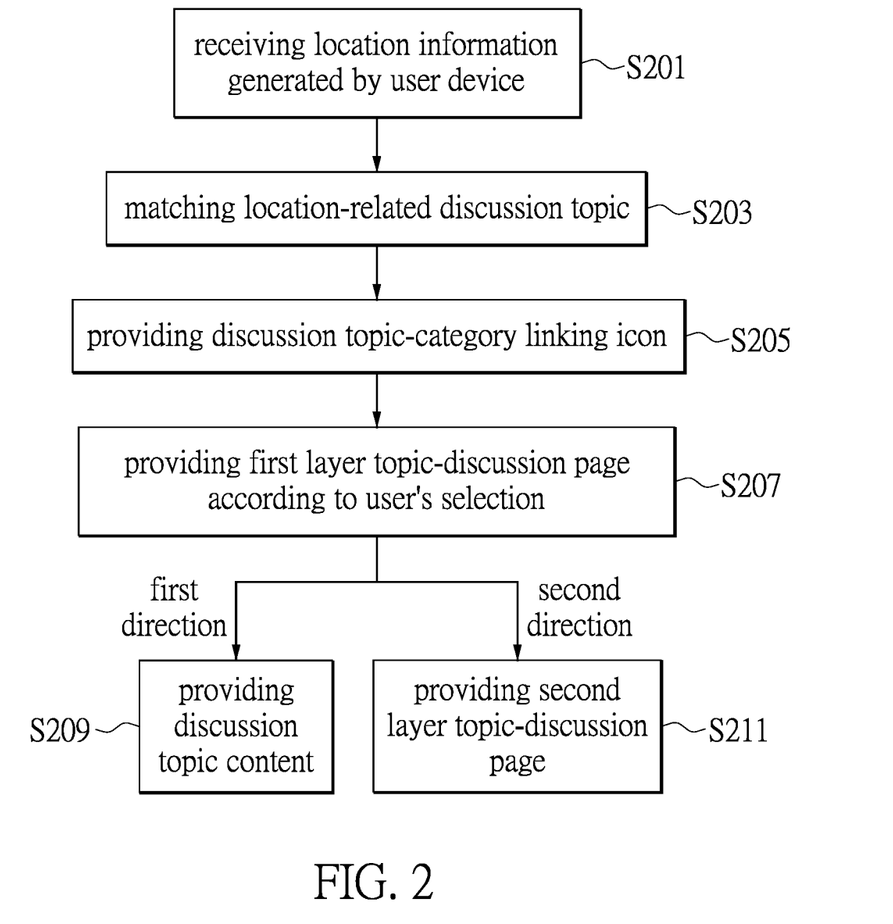
FIG. 2 is a flowchart illustrating an operating method of the location-related topic discussion system according to one embodiment of the present disclosure.

FIG. 2 then shows a software process illustrating a process of operation of the server according to one embodiment of the present disclosure. When computer instructions stored in a non-transitory computer-readable recording medium are executed in a user device, the user device connects with the server of the location-related topic discussion system, loads contents from the server, and initiates the graphical user interface. Therefore, the server can provide the location-related discussion topics to the user device. The software process that initiates the graphical user interface can be expressed by a series of schematic diagrams as shown in FIG. 3 to FIG. 7 in certain embodiments of the present disclosure.

The computer instructions embody a social media program. According to one embodiment of the present disclosure, the social media program that is executed in the user device is based on an electronic map. In another aspect of the present disclosure, a browser can be used to initiate a social media webpage provided by the server. After the social media program is executed in the user device, a graphical user interface is initiated and a map interface is formed as a front page.

Figure 3:
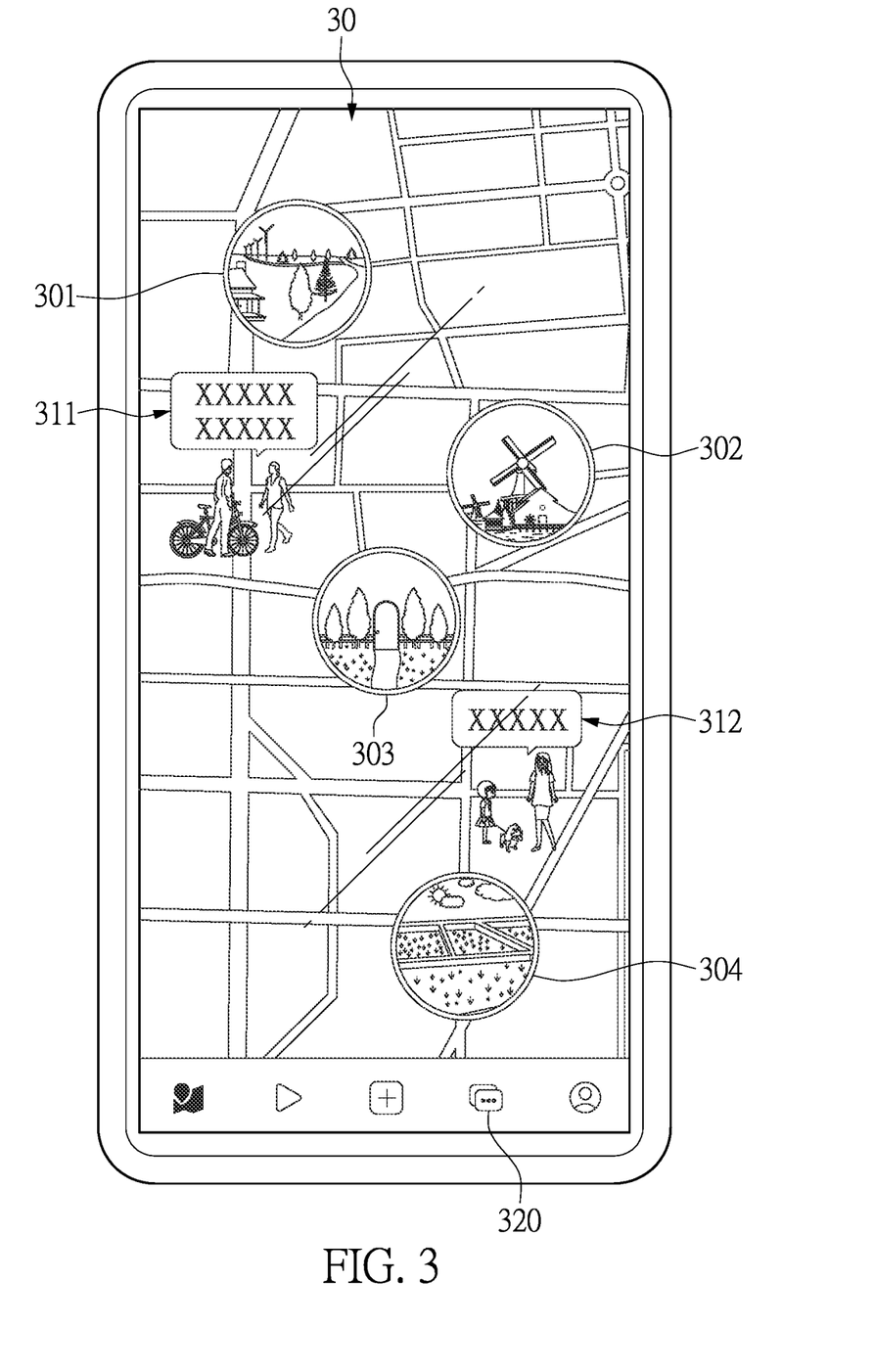
FIG. 3 is a schematic diagram illustrating a front page of software provided by the location-related topic discussion system according to one embodiment of the present disclosure.

Reference is made to FIG. 3, which is a schematic diagram depicting a software front page that is provided by the location-related topic discussion system according to one embodiment of the present disclosure. An electronic map 30 as shown in the diagram includes various linking icons that are marked at different locations on the electronic map 30. The linking icons are such as a plurality of audiovisual linking icons 301, 302, 303 and 304 and a plurality of discussion-topic-category linking icons 311 and 312. The quantity and types of the linking icons are not limited in the present disclosure.

Furthermore, the front page of the electronic map 30 as shown in FIG. 3 mainly includes a variety of linking icons, and several function buttons that are provided for assisting the user to browse the location-related contents are shown at the bottom of the main page. For example, the function buttons provide functions such as positioning a current location of the user, playing all of the audiovisual contents listed on a browsed page, adding a location-related audiovisual content, and maintaining a user profile. Moreover, a link 320 represents one further function in which the system allows the user to add a new discussion topic. When the user adds a new location-related discussion topic via the link 320, the new discussion topic is uploaded and recorded in a topic-discussion database of the server. The discussion topic can be associated with at least a location data, a user data, and a discussion-topic category that are also recorded in the topic-discussion database.

When the user device executes the social media program, a front page will be entered. Further, the location information (or the location information and the user data) are formed and transmitted to the server (step S201). The location information can be a geographic range. In an exemplary example, a graphical user interface is initiated on a touch-sensitive display of the user device. The touch-sensitive display allows the user to manipulate the graphical user interface by using gestures to browse the contents thereon. By the user using the gestures, a display region can be formed by zooming in, zooming out and/or moving the graphical user interface. The display region represents a geographic range. The software-implemented matching module of the server matches with one or more location-related discussion topics and also the one or more location-related audiovisual contents within the geographic range by querying the topic-discussion database according to the location information (step S203). At this time, the one or more location-related discussion-topic-category linking icons corresponding to the location-related discussion topics, and the audiovisual content linking icons, are also obtained. The linking icons are then provided to the user device via the network (step S205).

It should be noted that the location-related discussion topic can be various location-related discussion topics created by multiple users of the server. For example, the discussion topic can be a location-related topic, and the location-related audiovisual contents can be audiovisual contents related to geographic locations and transmitted to the server by multiples users via the network. The location-related audiovisual contents can be the images of scenic spots, landmarks, or the images related to the location.

Figure 4:
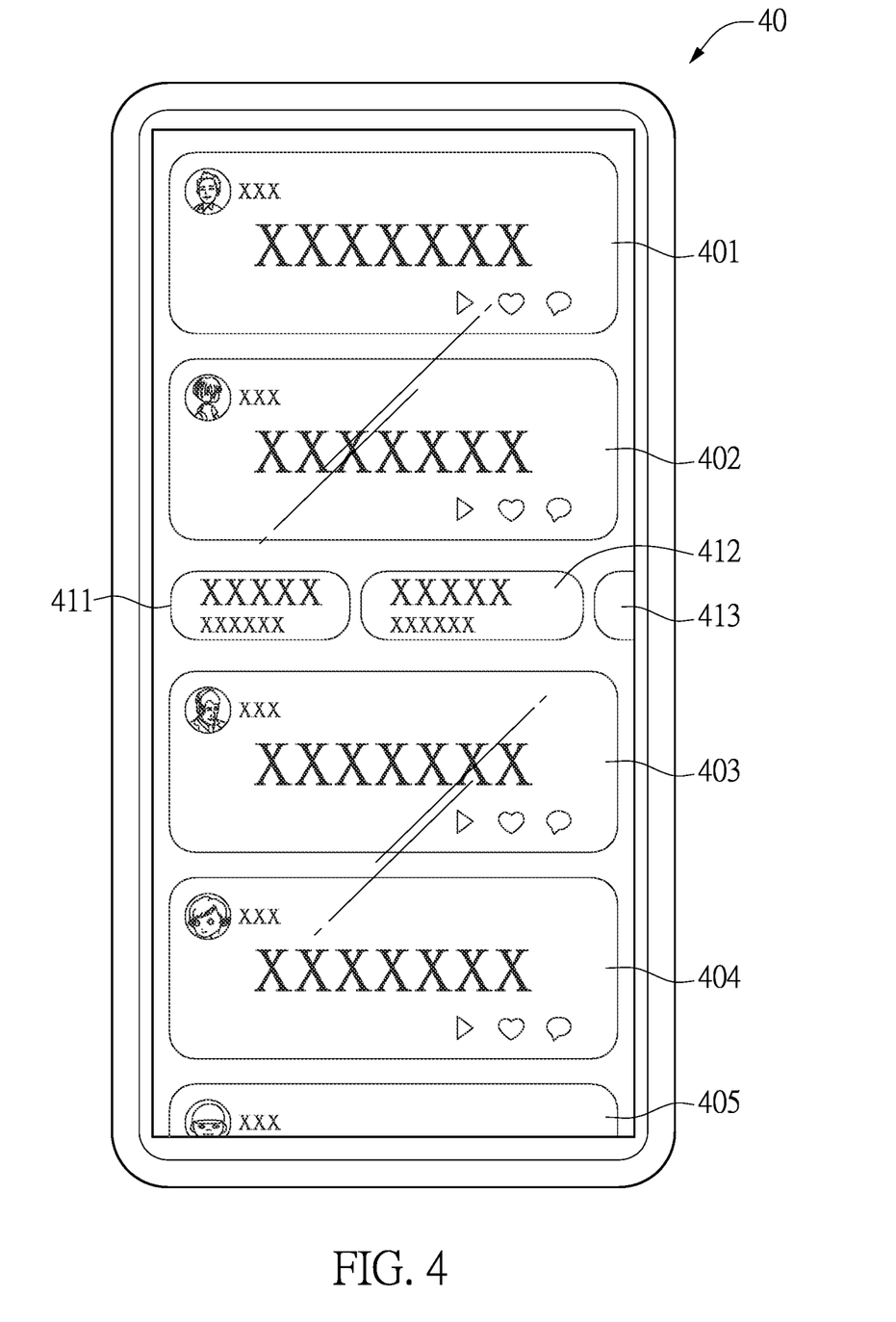
FIG. 4 is a schematic diagram illustrating a first layer topic-discussion page provided by the location-related topic discussion system according to one embodiment of the present disclosure.

The user can browse the one or more location-related discussion topics and/or the audiovisual contents within the geographic range via the graphical user interface. When one of location-related discussion topic category links is selected by the user, a first layer topic-discussion page is provided by the server according to the selection made by the user. The contents shown on the graphical user interface are the contents related to the selected discussion topics. Reference is made to FIG. 4, which is a schematic diagram illustrating a plurality of topic-discussion areas that are sorted by popularity in a first direction and one or more location-related discussion topic categories that are obtained according the personal preference of the user in a second direction (step S207).

FIG. 4 shows a schematic diagram illustrating the first layer topic-discussion page in one embodiment of the present disclosure. A first layer topic-discussion page 40 is schematically shown on a graphical user interface initiated on a mobile device. The first direction can be a vertical direction in the diagram, and the second direction can be a horizontal direction. Furthermore, a plurality of topic-discussion areas 401, 402, 403, 404 and 405 are shown along the vertical direction.

Still further, several horizontal discussion-topic categories 411, 412 and 413 are shown between the topic-discussion area 402 and the topic-discussion area 403. The system allows the user to discuss any of the topics in areas such as the topic-discussion areas 401, 402, 403, 404 and 405, or the topic categories 411, 412 and 413 through various button functions, and to give the likes to the topics, to follow the topics, or to share the topics.

According to one embodiment of the present disclosure, the topic-discussion areas 401, 402, 403, 404 and 405 shown in the first direction can be one or more topic-discussion areas that are sorted by popularity. The user uses the user device to browse the popularity-sorted topic-discussion areas by performing a vertical swipe gesture. The discussion-topic categories 411, 412 and 413 shown in the second direction can be one or more location-related discussion topic categories that are obtained according to the personal preference of the user. The user can browse the location-related discussion topic categories by performing horizontal swipe gesture.

Further, after discussion topics are matched in the topic-discussion database by the server, the topic-discussion areas 401, 402, 403, 404 and 405 shown in the first direction are provided. However, when the user continues to browse the areas by performing the vertical swipe gesture, the system continuously provides the topic-discussion areas within other geographic ranges that are different from the location originally selected by the user if the contents in the original geographic range run out. The above-mentioned topic-discussion areas within other geographic ranges can also be sorted by popularity.

It should be noted that, according to the above embodiments, the location-related topic discussion system provides multiple topic-discussion areas that are sorted in the first direction. The topic-discussion areas are sorted according to the popularity of the discussion topics. One of the ways to calculate the popularity is based on timeliness, likes, and/or the personal preference of the user on each of the discussion topics, thereby obtaining the popularity of each of the discussion topics. For example, according to one exemplary example of an algorithm operated in the location-related topic discussion system, the preference for a specific discussion topic can be determined based on a number of likes, shares, comments and/or follows performed on the discussion topic. The scenarios that the server relies on to determine the preference for the specific discussion topic include the user following a discussion topic but not giving any comment or likes to the discussion topic, and a number of times that the discussion topic is seen by all the users. Furthermore, when determining the number of times that the discussion topic is seen by all the users, periods of time can also be considered. For example, the user is determined to be following a discussion topic only if the user sees the specific discussion topic for a period of time, e.g., seven seconds.

The personal preference of the user is determined based on comments made by the user, a staying time and interest (such as the acts of likes, shares, comments and/or follows) of the user. Accordingly, the personal preference of the user can be generated and then used for matching the discussion topics that are consistent with the personal preference of the user.

Figure 5:
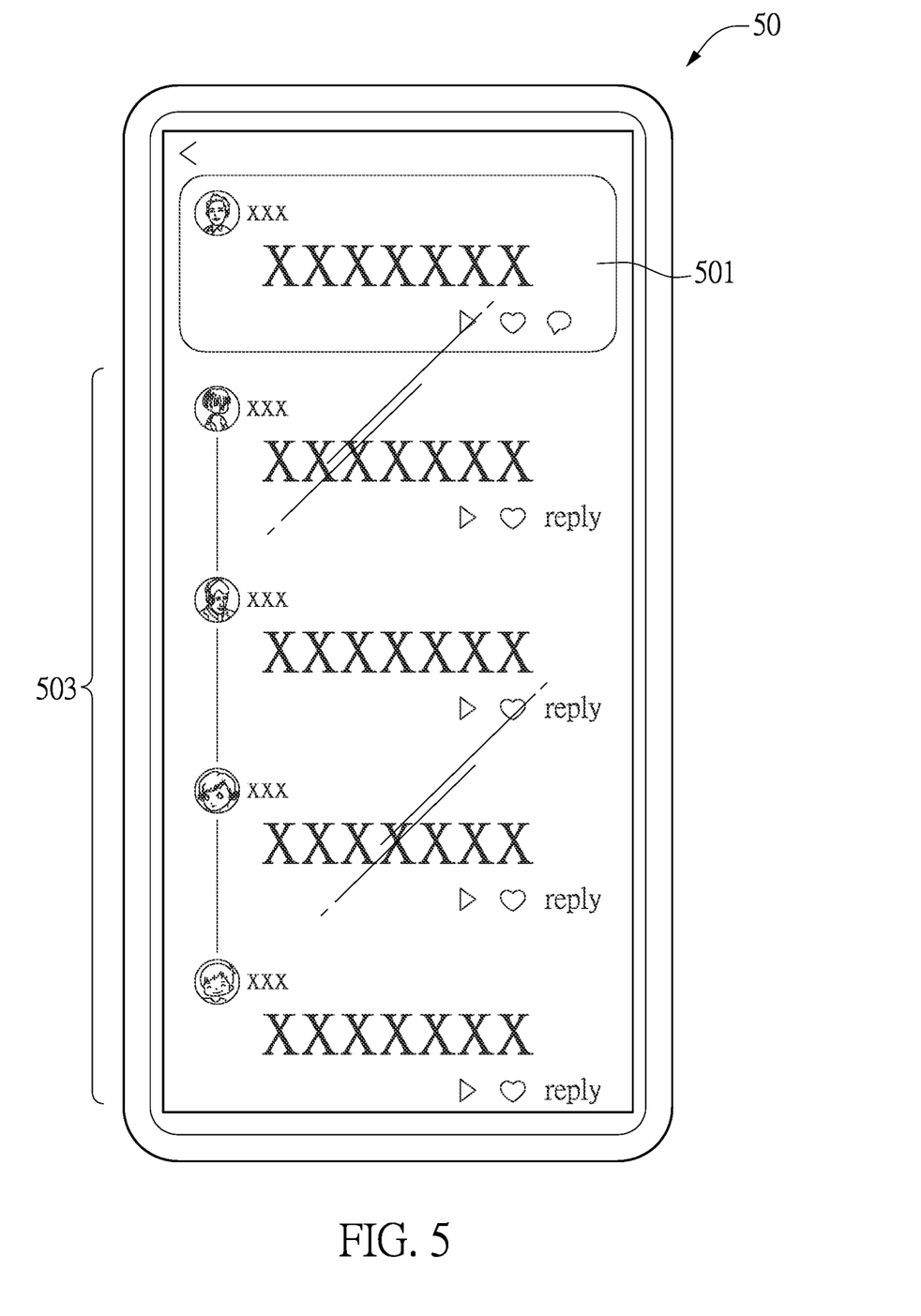
FIG. 5 is a schematic diagram illustrating a discussion-topic dialogue page provided by the location-related topic discussion system according to one embodiment of the present disclosure.

Afterwards, when the user uses the touch-sensitivity display of the user device, or other manners of input to select one of the topic-discussion areas in the first direction, the server provides the content of the selected discussion topic (step S209). Reference is made to FIG. 5, which is a schematic diagram illustrating a discussion-topic dialogue page that is provided by the location-related topic discussion system according to one embodiment of the present disclosure. When the server receives a selection of one of the topic-discussion areas in the first direction from the user device, a corresponding content of the selected topic-discussion area can be obtained by querying the topic-discussion database, so as to be provided to the user device. The corresponding content is displayed on the discussion-topic dialogue page 50 as shown in FIG. 5, in which one or more discussion topics 501 and the discussion contents 503 are shown.

Figure 6:
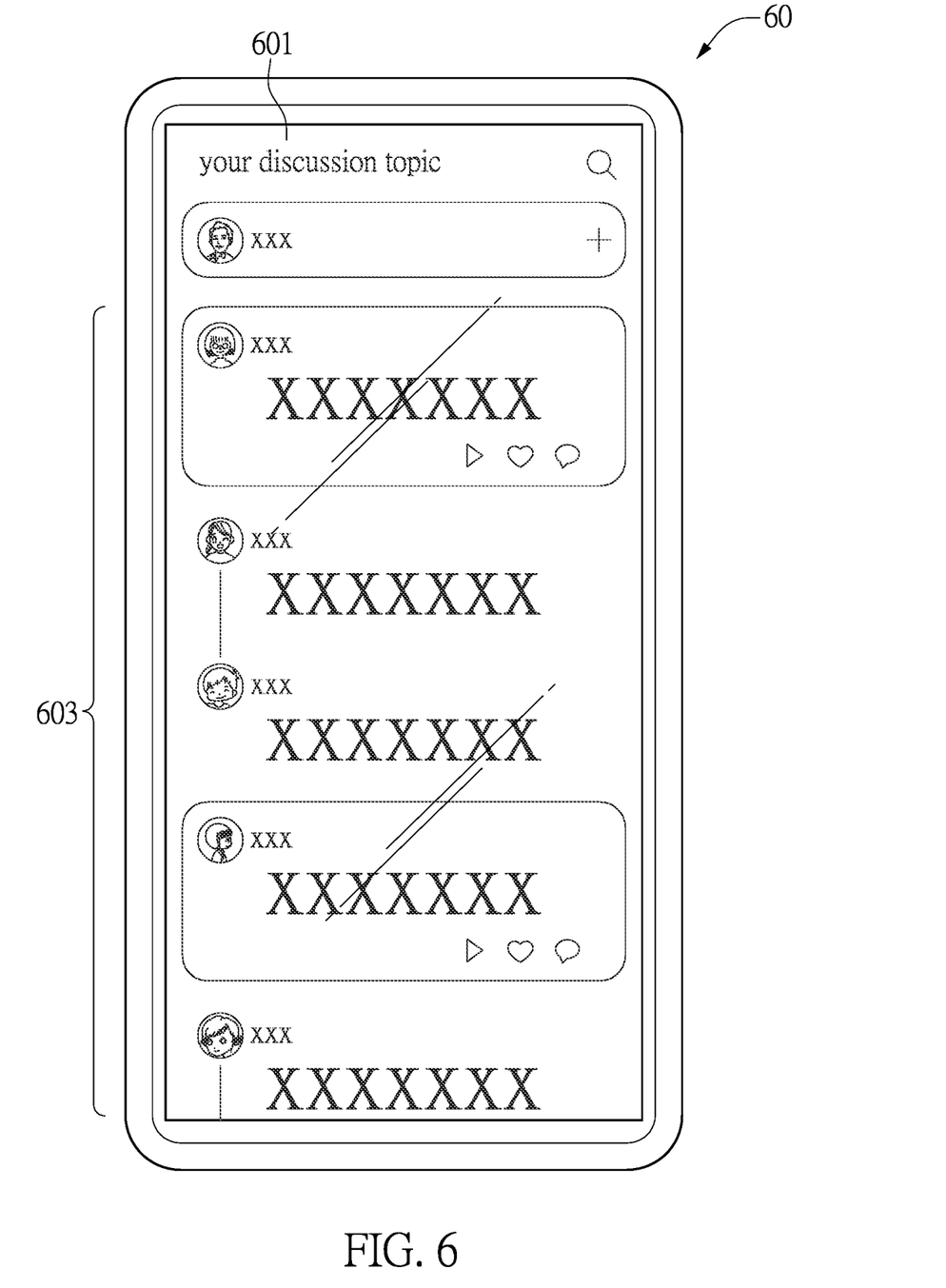
FIG. 6 is a schematic diagram illustrating returning to a user-related discussion-topic page provided by the location-related topic discussion system according to one embodiment of the present disclosure.

In one embodiment of the present disclosure, reference is made to FIG. 6, which is a schematic diagram depicting returning to a user-related discussion-topic-page by the location-related topic discussion system. The user uses the graphical user interface to browse a discussion-topic page 60 including various discussion topics. Multiple discussion topics 603 that are discussed are shown at the bottom of the figure. When the user finishes an activity (e.g., an act of leaving a message, giving a like, or following a topic) on the first layer topic-discussion page, a user-related discussion-topic button 601 provided on the discussion-topic page 60 can be used for quickly returning to the topic-discussion area that the user previously participated in.

On the other hand, when the user uses the touch-sensitive display of the user device or any other manners of input to select one of the discussion-topic categories in the second direction, the server provides a second layer topic-discussion page by querying the topic-discussion database according to the one of the discussion-topic categories selected by the user (step S211).

Figure 7:
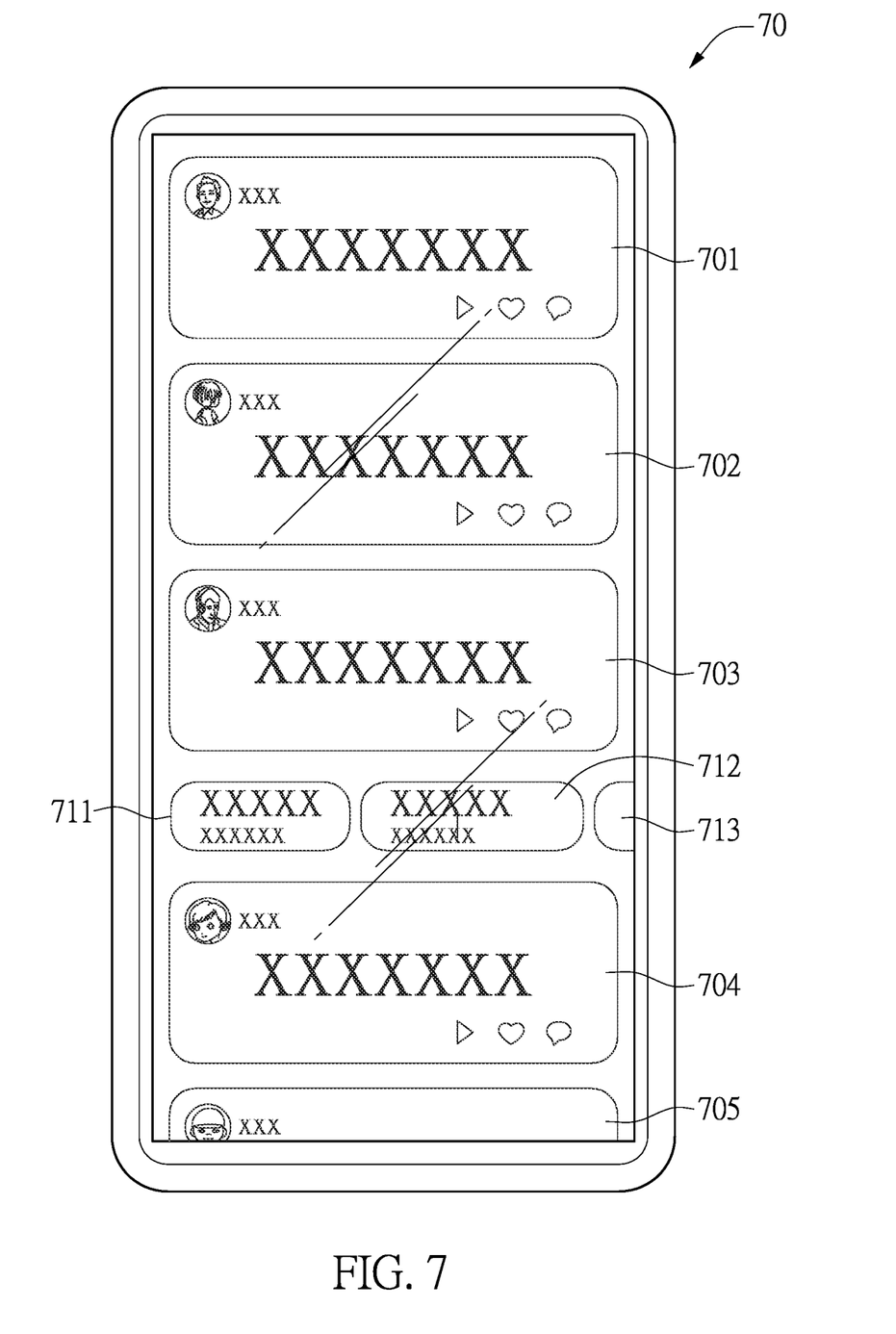
FIG. 7 is a schematic diagram illustrating a second layer topic-discussion page provided by the location-related topic discussion system according to one embodiment of the present disclosure.

According to an exemplary example of the second layer topic-discussion page provided by the location-related topic discussion system, as shown in a schematic diagram of FIG. 7, a second layer topic-discussion page 70 also provides a manner of showing the discussion topics in two directions. For example, in a first direction (e.g., a vertical direction), one or more location-related first direction topic-discussion areas 701, 702, 703, 704 and 705 in accordance with a personal preference are provided, and, in a second direction (e.g., a horizontal direction), one or more location-related second direction topic-discussion areas 711, 712 and 713 are provided according to location attributes of the discussion topics in each of the topic-discussion areas in the first direction. The location-related second direction topic-discussion areas 711, 712 and 713 are provided for the user to select one of the location-related second direction topic-discussion areas 711, 712, and 713 to enter a discussion page. However, a software process of the location-related topic discussion system can provide multiple discussion-topic categories according to the attributes of the discussion topics and the personal preference if the discussion topics in each of the topic-discussion areas in the first direction lack any location-related attributes.

Similarly, in the second layer topic-discussion page, if the location-related topic discussion system runs out of the location-related discussion topics that match with the personal preference in the topic-discussion areas in the first direction, a range of the location related to the topic-discussion area can gradually expand outward.

In one exemplary example, when a user clicks on one of the linking icons of location-related discussion topics about the National Basketball Association (NBA) league via an electronic-map-based graphical user interface initiated by a social media program, a first layer topic-discussion page is entered, in which multiple location-related topic-discussion topics about the NBA league are shown along a first direction. The location-related topic-discussion topics can be sorted by popularity. Further, one or more discussion-topic categories that are about the NBA league and match the personal preference of the user are shown along a second direction. In one further example, when the user clicks on one of the linking icons of discussion topics that relate to Ukraine via the graphical user interface, the first layer topic-discussion page is entered and the topic-discussion areas shown along the first direction are related to Ukraine. Multiple discussion-topic categories that relate to other issues relating to Ukraine are shown along the second direction. A variety of discussion topics provided by the system can be dynamically updated based on changes of information such as the personal preference of the user and popularities of the discussion topics.

In conclusion, according to the abovementioned embodiments of the location-related topic discussion system, the operating method, and the non-transitory computer-readable recording medium, in a software algorithm that is operated in the system, the areas and the location-related discussion topics that are of interest to a user can be obtained based on user behaviors recorded by the algorithm. The system can accordingly group the users, and one of the objectives is to recommend the discussion topics in the areas of interest to each of the users, respectively. In practice, the system marks the location-related discussion topic category links on a graphical user interface such as a map. The system then provides the topic-discussion areas that are sorted by popularity according to a selection made by the user, and provides the location-related discussion topic category that matches with the personal preference of the user. Therefore, the user can easily access the location-related discussion topic. By means of computation by the system, more location-related discussion topics that match with the personal preference of the user can be obtained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A location-related topic discussion system, comprising:
a server having a topic-discussion database;
wherein the server receives user data and location information from a user device via a network to query the topic-discussion database according to a personal preference and the location information to acquire one or more location-related discussion topic categories corresponding to the personal preference, and the one or more location-related discussion topic categories corresponding to the personal preference are provided to the user device and displayed on a graphical user interface initiated in the user device;
wherein the server determines a geographic range according to the location information, obtains one or more location-related discussion topics within the geographic range by querying the topic-discussion database, and provides one or more location-related discussion-topic-category linking icons corresponding to the one or more location-related discussion topics to the user device for marking on the graphical user interface initiated in the user device;
wherein, when the server receives a selected location-related discussion topic category link from the user device, a first layer topic-discussion page is formed, wherein, after querying the topic-discussion database according to the personal preference and the location information, one or more topic-discussion areas that are related to a discussion topic and sorted by popularity are obtained, wherein the one or more location-related discussion topic categories corresponding to the personal preference and the one or more topic-discussion areas that are related to the discussion topic and sorted by popularity are displayed on the first layer topic-discussion page that is formed and displayed on the graphical user interface, and wherein the first layer topic-discussion page includes:

the one or more topic-discussion areas sorted by popularity being displayed in a first direction; and the one or more location-related discussion topic categories corresponding to the personal preference being displayed in a second direction;

wherein the first direction is a vertical direction that allows a user of the user device to browse the topic-discussion areas sorted by popularity by performing a vertical swipe gesture; and the second direction is a horizontal direction that allows the user to browse the location-related discussion topic categories corresponding to the personal preference by performing a horizontal swipe gesture, wherein the server continuously provides the topic-discussion areas that are sorted by popularity based on the vertical swipe gesture performed by the user in the first direction, and a range of a location related to the selected location-related discussion topic category gradually expands outward so that the popularity-sorted topic-discussion areas are continuously provided.

2. The location-related topic discussion system according to claim 1, wherein, when the topic-discussion areas that are sorted by popularity and provided by the server run out, the server actively switches to another discussion topic.

3. The location-related topic discussion system according to claim 1, wherein the server receives a selected one of one or more discussion-topic categories in the second direction from the user device; wherein, after querying the topic-discussion database, the server provides a second layer topic-discussion page that includes one or more location-related topic-discussion areas that match with the personal preference in the first direction, and the server provides one or more location-attribute-related topic-discussion areas in the second direction according to a location attribute of the topics in each of the topic-discussion areas in the first direction.

4. The location-related topic discussion system according to claim 1, wherein the graphical user interface is a map interface, and one or more location-related discussion-topic-category linking icons and one or more location-related audiovisual content linking icons are marked on the map interface according to a geographic range related to the location information generated by the user device.

5. The location-related topic discussion system according to claim 1, wherein the location-related topic discussion system relies on the graphical user interface initiated by an electronic-map-based social media program; when the user adds a new location-related discussion topic link, and the new discussion topic is uploaded and recorded in a topic-discussion database of the server; wherein, the location-related discussion topic link that is newly added relates to at least one of geographic information, user data, and a discussion-topic category that are recorded in the topic-discussion database.

6. An operating method for a location-related topic discussion system, executed in a server that includes a topic-discussion database; and the operating method comprising:

querying the topic-discussion database according to a personal preference and location information generated by a user device to acquire one or more location-related discussion topic categories in accordance with the personal preference, wherein the one or more location-related discussion topic categories corresponding to the personal preference are provided to the user device and displayed on a graphical user interface initiated in the user device;

wherein the server determines a geographic range according to the location information, obtains one or more location-related discussion topics within the geographic range by querying the topic-discussion database, and provides one or more location-related discussion-topic-category linking icons corresponding to the one or more location-related discussion topics to the user device for marking on the graphical user interface initiated in the user device; wherein, when the server receives a selected location-related discussion topic category link from the user device, a first layer topic-discussion page is formed, wherein the one or more location-related discussion topic categories corresponding to the personal preference and the one or more topic-discussion areas that are related to the discussion topic and sorted by popularity based on the location information are displayed on a first layer topic-discussion page that is formed and displayed on the graphical user interface, and wherein the first layer topic-discussion page includes:

the one or more topic-discussion areas sorted by popularity being displayed in a first direction; and the one or more location-related discussion topic categories corresponding to the personal preference being displayed in a second direction;

wherein the first direction is a vertical direction that allows a user of the user device to browse the topic-discussion areas sorted by popularity by performing a vertical swipe gesture; and the second direction is a horizontal direction that allows the user to browse the location-related discussion topic categories corresponding to the personal preference by performing a horizontal swipe gesture, wherein the server continuously provides the topic-discussion areas that are sorted by popularity based on the vertical swipe gesture performed by the user in the first direction, and a range of a location related to the selected location-related discussion topic category link gradually expands outward so that the popularity-sorted topic-discussion areas are continuously provided.

7. The operating method according to claim 6, wherein the server receives a selected one of the discussion-topic categories in the second direction from the user device; wherein, after querying the topic-discussion database, the server provides a second layer topic-discussion page that includes one or more location-related topic-discussion areas that match with the personal preference in the first direction, and the server provides one or more location-attribute-related topic-discussion areas in the second direction according to a location attribute of the topics in each of the topic-discussion areas in the first direction.

8. A non-transitory computer-readable recording medium that stores computer instructions that are executed in a user device for connecting with a server of a location-related topic discussion system, loading contents from the server and initiating a graphical user interface, wherein steps of the computer instructions that are executed in the user device include:
- displaying, on the graphical user interface, one or more location-related discussion topic categories corresponding to a personal preference that are provided by the server that queries a topic-discussion database according to location information generated by the user device and the personal preference;
- when the computer instructions are executed and before content of the first layer topic-discussion page is received from the server, one or more location-related discussion-topic-category linking icons to be marked on the graphical user interface corresponding to the one or more location-related discussion topic categories are obtained by the server querying the topic-discussion database according to the location information transmitted by the user device, wherein the one or more location-related discussion-topic-category linking icons are provided to a user to select one of the location-related discussion topic categories,
- wherein a first layer topic-discussion page is formed on the graphical user interface, and wherein the first layer topic-discussion page includes:
  - one or more location-related topic-discussion areas that are related to a discussion topic, sorted by popularity, and obtained based on the location information being displayed in a first direction; and
  - one or more location-related discussion topic categories corresponding to the personal preference being displayed in a second direction;
- wherein, through the computer instructions executed in the user device, when the first layer topic-discussion page is displayed on the user device, a user of the user device is able to browse the popularity-sorted topic-discussion areas by performing a swipe gesture in the first direction, and the user is able to browse the location-related discussion topic categories corresponding to the personal preference by performing the swipe gesture in the second direction,
- wherein the first direction is a vertical direction that allows a user of the user device to browse the topic-discussion areas sorted by popularity by performing a vertical swipe gesture; and the second direction is a horizontal direction that allows the user to browse the location-related discussion topic categories corresponding to the personal preference by performing a horizontal swipe gesture,
- wherein the topic-discussion areas that are sorted by popularity are continuously provided by the server based on the vertical swipe gesture performed by the user in the first direction, and a range of a location related to the selected location-related discussion topic category link gradually expands outward so that the popularity-sorted topic-discussion areas are continuously provided.

\* \* \* \* \*